US012536922B2

(12) United States Patent
Stone et al.

(10) Patent No.: US 12,536,922 B2
(45) Date of Patent: Jan. 27, 2026

(54) PROCEDURE GUIDANCE AND TRAINING APPARATUS, METHODS AND SYSTEMS

(71) Applicant: Simulated Inanimate Models, LLC, Pittsford, NY (US)

(72) Inventors: Nelson Stone, Vail, CO (US); Steven Griffith, Honeoye Falls, NY (US); Jonathan Stone, Rochester, NY (US)

(73) Assignee: Viomerse, Inc., Pittsford, NY (US)

( * ) Notice: Subject to any disclaimer, the term of this patent is extended or adjusted under 35 U.S.C. 154(b) by 0 days.

(21) Appl. No.: 18/815,288

(22) Filed: Aug. 26, 2024

(65) Prior Publication Data
US 2024/0420592 A1    Dec. 19, 2024

Related U.S. Application Data

(63) Continuation of application No. 17/972,422, filed on Oct. 24, 2022, now Pat. No. 12,106,678.
(Continued)

(51) Int. Cl.
*G09B 23/28* (2006.01)
*G02B 27/01* (2006.01)
*G06F 3/01* (2006.01)

(52) U.S. Cl.
CPC ........... *G09B 23/28* (2013.01); *G02B 27/017* (2013.01); *G06F 3/011* (2013.01)

(58) Field of Classification Search
CPC ................................ G09B 23/28; G09B 23/30
See application file for complete search history.

(56) References Cited

U.S. PATENT DOCUMENTS

| 6,608,628 B1 * | 8/2003 | Ross ...................... G16H 40/67 |
| | | 718/107 |
| 10,665,134 B2 * | 5/2020 | Stone .................. G09B 19/003 |

(Continued)

*Primary Examiner* — Kurt Fernstrom
(74) *Attorney, Agent, or Firm* — Woods Oviatt Gilman LLP; Katherine H. McGuire, Esq.

(57) ABSTRACT

Procedure training apparatus, methods and systems which in one embodiment allow surgical trainees to receive expert clinical guidance during live surgery or to practice surgical skills on anatomical models in a realistic manner with an augmented reality headset which is in audio and visual communication with a remotely located trainer having a similar AR headset. A unique feature of the system includes providing live or static imaging of the surgical site to the AR headsets of the trainee and trainer wherein the imaging is provided from medical or other devices (e.g., ultrasound) through a device(s) media hub. The images are displayed in the field of view of the surgeon so that they may see their hands, the patient (or model) and the imaging simultaneously. Controls allow the imaging on the respective AR headsets to be switched on command typically by the trainer which allows the trainer to deliver the trainer's surgical site image (e.g., on their own model) to the AR headset of the trainee to illustrate correct procedure, for example. Once the trainee views the trainer's imaging of correct procedure, the imaging source may be switched back to the trainee's surgical site so that they may continue the procedure. Instruction or live clinical support during surgical procedures allow procedures to be recorded and recordings segregated by machine learning model and class, allowing for semi-supervised and/or unsupervised learning. After machine learning models are created, automated guidance and/or alerts may be given during the surgical procedure.

20 Claims, 9 Drawing Sheets

Related U.S. Application Data (60) Provisional application No. 63/341,234, filed on May 12, 2022, provisional application No. 63/271,153, filed on Oct. 23, 2021.

(56) References Cited

U.S. PATENT DOCUMENTS

| | | | |
|---|---|---|---|
| 10,672,288 B2* | 6/2020 | Ribeira | G09B 9/00 |
| 10,803,761 B2* | 10/2020 | Welch | G06T 19/006 |
| 10,828,107 B2* | 11/2020 | Sela | G09B 23/285 |
| 11,315,438 B1* | 4/2022 | Hannaford | G09B 23/285 |
| 11,551,578 B2* | 1/2023 | Eggert | G09B 5/06 |
| 2006/0082542 A1* | 4/2006 | Morita | A61B 5/7475 |
| | | | 345/156 |
| 2006/0170652 A1* | 8/2006 | Bannai | G06F 3/011 |
| | | | 345/156 |
| 2007/0248261 A1* | 10/2007 | Zhou | G06T 19/006 |
| | | | 382/154 |
| 2012/0139828 A1* | 6/2012 | Lok | G16Z 99/00 |
| | | | 345/156 |
| 2013/0157239 A1* | 6/2013 | Russo | G09B 23/28 |
| | | | 434/262 |
| 2014/0176661 A1* | 6/2014 | Smurro | G16H 20/40 |
| | | | 348/14.06 |
| 2014/0275760 A1* | 9/2014 | Lee | A61B 1/00045 |
| | | | 600/102 |
| 2017/0243499 A1* | 8/2017 | Maruyama | G06F 3/015 |
| 2018/0090029 A1* | 3/2018 | Fisher | G09B 23/28 |
| 2018/0293802 A1* | 10/2018 | Hendricks | G09B 23/30 |
| 2019/0130792 A1* | 5/2019 | Rios | G09B 23/285 |
| 2019/0139426 A1* | 5/2019 | Kesavadas | G06T 19/006 |
| 2019/0380792 A1* | 12/2019 | Poltaretskyi | G06T 7/0012 |
| 2020/0038119 A1* | 2/2020 | Geri | G06F 16/53 |
| 2020/0051448 A1* | 2/2020 | Welch | G06F 3/016 |
| 2021/0093386 A1* | 4/2021 | Poltaretskyi | A61F 2/4081 |
| 2022/0172797 A1* | 6/2022 | Xie | G09B 9/00 |

* cited by examiner

PROCEDURE GUIDANCE AND TRAINING APPARATUS, METHODS AND SYSTEMS

CROSS REFERENCE TO RELATED APPLICATIONS

This application is a continuation of U.S. patent application Ser. No. 17/972,422, filed Oct. 24, 2022 which claims the benefit of U.S. Provisional Patent Application No. 63/341,234, filed May 12, 2022 and U.S. Provisional Application No. 63/271,153, filed Oct. 23, 2021, the entireties of which are included herein by reference.

BACKGROUND OF THE INVENTION

The present invention relates to apparatus, systems and methods for providing procedure guidance for a single practitioner and/or training between at least two persons referred to herein as "Trainee" and "Trainer". While the invention has broad applicability to a wide variety of technical fields (examples of which will be described further below), in an embodiment of the invention, apparatus, systems and methods are provided for remote surgical training and/or proctoring and/or clinical guidance which utilize human computer interfaces ("HCI") such as, in a non-limiting example, augmented reality ("AR") headsets with surgical site imaging and telecommunication software. In a training embodiment of the invention, a Trainee may be, as non-limiting examples, a medical student, surgical resident, or experienced surgeon learning a new procedure in which they are not necessarily proficient or simply wish to refresh their skills, and a "Trainer" may be, as non-limiting examples, a surgeon, professor, or medical sales representative having proficiency in the procedure being performed. The Trainee and Trainer may or may not be in different geographical locations and there may optionally be more than one Trainee and/or Trainer working within the system at the same time. In a clinical guidance embodiment of the invention, a single practitioner may use the inventive apparatus, system and method to guide a procedure without having to look away from the patient.

Surgical training is presently done in a variety of ways including on artificial body and organ models as well as directly on humans and animals, both living and dead. Expert guidance to a Trainee of a surgical procedure is a necessity yet it is apparent presently available surgical training methods are lacking and there is a need for more efficient and effective surgical training methodologies.

It is known that there are a large number of data points a medical practitioner must continually monitor during a surgical or other medical procedure. In surgery, surgical team members such as anesthesiologists and nurses may provide the surgeon with periodic verbal indications of a patient's vital signs and condition. In these instances, the surgeon may receive such verbal information without having to look away from the surgical site. Other patient data, such as patient organ imaging done either preoperatively for reference by the surgeon during minimally invasive surgery, which can be viewed prior to the procedure or broadcast to the surgeon during the procedure, or imaging performed on the patient in the operating room during the surgery, must be personally viewed by the surgeon during the procedure. The imaging is typically displayed on a computer monitor or the like which requires the surgeon to look away from the surgical site when viewing the monitor (this also holds true for the single practitioner performing a procedure on a single patient). This is not ideal as it could lead to unnecessarily long surgery times and potential surgical errors attributable to intermittent surgeon distraction from the surgical site as they must look away from the patient and the hands to view the image on the monitor.

SUMMARY OF THE INVENTION

In an exemplary embodiment of the invention, surgical training apparatus, methods and systems are provided which utilize three main components in the form of a human computer interface which, in the preferred embodiment, is an augmented reality (AR) headset with see-through-optic display and imaging array, an imaging device(s) electronics hub, and software enabling telecommunication and AR display controls.

While one embodiment of the invention is used by a single practitioner on an artificial model or a live patient in a clinical setting, for example, the invention will be described herein with reference to a training embodiment of the invention involving a trainer and one or more trainees.

The Trainer and each of the one or more Trainees have their own respective AR headset, imaging device hub and software. The Trainer and each Trainee also have their own imaging device and surgical site which are all substantially the same such that they are all performing the same surgical procedure using the same type of imaging device.

The Trainer and each Trainee may view their own surgical sites through their respective AR headsets each having a see-through optics panel with one or more changeable image viewing areas on or adjacent the see-through optics panel.

The Trainer may control the image display of each Trainee AR headset. During a procedure the Trainer may select to see in the images in the Trainer's AR headset what the Trainee sees in the Trainee's AR headset. The Trainer may also select to display on the Trainee's AR headsets what the Trainer sees in the Trainer's surgical site (the "Trainer View") thus allowing the Trainees to watch the Trainer demonstrating a procedure. The Trainer may also select to send other video and/or text material to one or more of the Trainees' AR headsets. In certain circumstances the Trainer may elect to display both the Trainer's and Trainee's images side by side in the field of view (FOV) so both can watch each other performing a task simultaneously.

The AR headset may include speakers and a microphone that permit two-way communication between the Trainee and Trainer. An electronically controlled pointing device may also be provided allowing the Trainer to selectively highlight the Trainer's hands, surgical site, and/or any of a number of devices which require instruction for the Trainee. Pointing devices may also be provided to the Trainees allowing them to highlight image areas of interest for discussion with the Trainer. The pointing device may be mounted in the headset to highlight an external object or location or electronically superimposed by either trainer or trainee from the controller onto a live image being generated by a device which typically would display the image on a monitor.

Live or static imaging of the surgical site may be displayed on the AR headsets of the Trainees and Trainer wherein the imaging is provided from medical or other devices (e.g., ultrasound) through the device(s) hub. The images are displayed in the field of view of the Trainer and/or Trainees so that they may see their hands, the patient (or model) and the imaging simultaneously. Controls allow the imaging on the respective AR headsets to be switched on command typically by the Trainer which allows the Trainer to deliver the Trainer's surgical site image (e.g., on their own model) to the AR headset of the Trainees to illustrate correct procedure, for example. Once the Trainee views the Trainer's imaging of correct procedure, the imaging source may be switched back to the Trainee's surgical site so that they may continue the procedure.

Instruction or live clinical support during surgical procedures or on a model allow procedures to be recorded and recordings segregated by machine learning model and class, allowing for semi-supervised and/or unsupervised learning. After machine learning models are created, automated guidance and/or alerts may be given during the surgical procedure. In addition, these recordings can be used for certification or quality assurance and can be recorded using the line of sight (LOS) technology described below and the position of the images (for example the live ultrasound stacked on top of the hands) that are created by the software and controlled by the trainer or other user. It is noted the term "stacked" as used herein does not mean an overlay arrangement of two or more viewing fields but rather is meant to describe adjacent placement (in any direction such as vertical, horizontal or diagonal, for example) of two or more viewing fields.

The device connection hub allows plug-and-play connectivity for one or more medical imaging sources, or other non-imaging devices such as an EKG (including multiple simultaneously), camera, or other peripheral used during surgery or any other complex procedure. The plug-and-play connectivity can be hard wired or through wireless connections using any number of technologies, such as Quick Response or "QR" codes to initiate the connections.

A Trainee's live (real time) interactions with the connected device(s) may be broadcast via their respective AR headset (imaging array data) to the AR headset of a remotely located Trainer who sees the Trainee's actions through the reflective or refractive portion of Trainer's AR headset see-through optic display or a traditional computer display or head-worn monitor. These additional displays can be located at the Trainer, Trainee or a remote site for viewing.

The software (sometimes referred to as the "remote training platform (RTP) or "RTP Software" herein) allows the simultaneous display of the aforementioned image, video and/or other feeds which may be selectively arranged via controls provided by the RTP Software via the RTP Software or through the controller so as to not obscure the view of the surgical field and thus maximize the Trainer's and Trainees' interactions with these devices. All of the functions herein described as contained in the RTP Software can be provided through video communication or contained within the controller.

The RTP Software also allows the Trainer to selectively message and/or play surgical scenario critical video, imaging and/or text/annotation content in the AR display of one or more Trainees.

The images or other chosen content may be presented to the AR headset, so they represent a real-life view. For example, presently available telecommunicating software such as ZOOM allow video images to appear as horizontal or vertical tiles. With the present invention, the Trainer has the ability via software provided controls to arrange the various images, so the device image is above and out of the way of the view of their hands. This allows the surgeon to view the otherwise hidden (inside the body) image on the exposed part of the surgical site while also allowing them to simultaneously see their own hands performing the procedure while never having to look away from the surgical site. In this last case scenario, the live image is visually positioned (stacked) to appear above the hands so both clinicians have see-through vison (the ultrasound image of the model or the patient producing this internal image) and watch their hands while performing the procedure. This spatial arrangement gives both Trainer and Trainee the impression they are doing open surgery.

In an embodiment of the invention, the AR headset imaging array may be operable to reconstruct a 360-degree view around the Trainer or a Trainee field of view ("FOV"), allowing the Trainer or Trainee to virtually "walk" around the Trainee's or Trainer's position, respectively, so they can observe the other's work and what the other sees in real time. This feature virtually puts the Trainer or Trainee in the room with the other.

In other embodiments of the invention, a system for providing communication between a trainee and a trainer of a procedure is provided. The system can include a headset wearable by the trainee and being configured to communicate with a trainer computing device; and a trainee pointer in the headset and a trainer pointer associated with the computing device. The headset can have a mounted camera oriented to capture a Field of View (FOV) corresponding to the viewable area in front of the trainee, the headset may also have a viewing pane that is at least partially transparent such that the viewing pane may selectively 1) display augmented reality images which partially obstruct vision of objects physically beyond the viewing pane, and 2) enter a transparent state displaying no virtual images and no augmented reality images.

The headset and computing device can coordinate to transmit augmented reality images. The objects physically beyond the viewing pane can include a live procedure adjacent to the headset or computing device. The trainee pointer and trainer pointer can enable the trainee and trainer to indicate to the other an Area of Interest (AOI) within the FOV relative to the live procedure. The headset may be configured to display in the viewing pane a boundary of the AOI. The headset and computing device may be configured to communicate with one another whether or not the FOV of the headset is oriented toward the AOI.

The trainee pointer and trainer pointer may selectively activated by the trainee and trainer, respectively. The trainer can request, through the computing device, a confirmation that the AOI is within the FOV of the headset. The headset can be configured to calculate a direction and magnitude of a discrepancy between the FOV of the first headset and the AOI. The headset can be configured to display an adjustment direction corresponding to the discrepancy. The headset can be configured to display an adjustment magnitude corresponding to the discrepancy. An object that is part of the live procedure may contain an identifying mark recognizable by the headset. The identifying mark can be recognizable by the headset as an AOI. The object may be held by the trainer or trainee.

In yet still other embodiments, a method for operating a headset to orient a FOV of the headset toward a desired object is provided. The method can include: providing a headset having a see-through-optic display and having a viewing pane configured to display augmented reality images that correspond with a live procedure the headset, the headset can be coordinated to exchange information including views with a computing device, the headset can have a pointer that can selectively indicate an AOI of an object within the FOV; receiving an AOI from the headset via the pointer; displaying the AOI using augmented reality images on at least one of the headset or computing device; comparing a FOV of the headset with the AOI to determine whether or not the AOI is within the FOV of the headset; and notifying whether or not the AOI is within the FOV of the headset.

The pointer can be a laser pointer. The AOI received from the headset via the pointer can be displayed on the computing device. The method can further include determining that the AOI is not within the FOV, and issuing a notification that the AOI is not within the FOV; determining a direction between the AOI and the FOV; and/or determining a magnitude of a distance between the AOI and the FOV. The live procedure can include a visible object having a code. The code can pertain to desired viewing parameters of the object. The method can further include the headset reading the code and executing the viewing parameters.

Additional objects, advantages and novel aspects of the present invention will be set forth in part in the description which follows and will in part become apparent to those in the practice of the invention, when considered with the attached figures.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein.

DETAILED DESCRIPTION OF A PREFERRED EMBODIMENT

Figure 1:
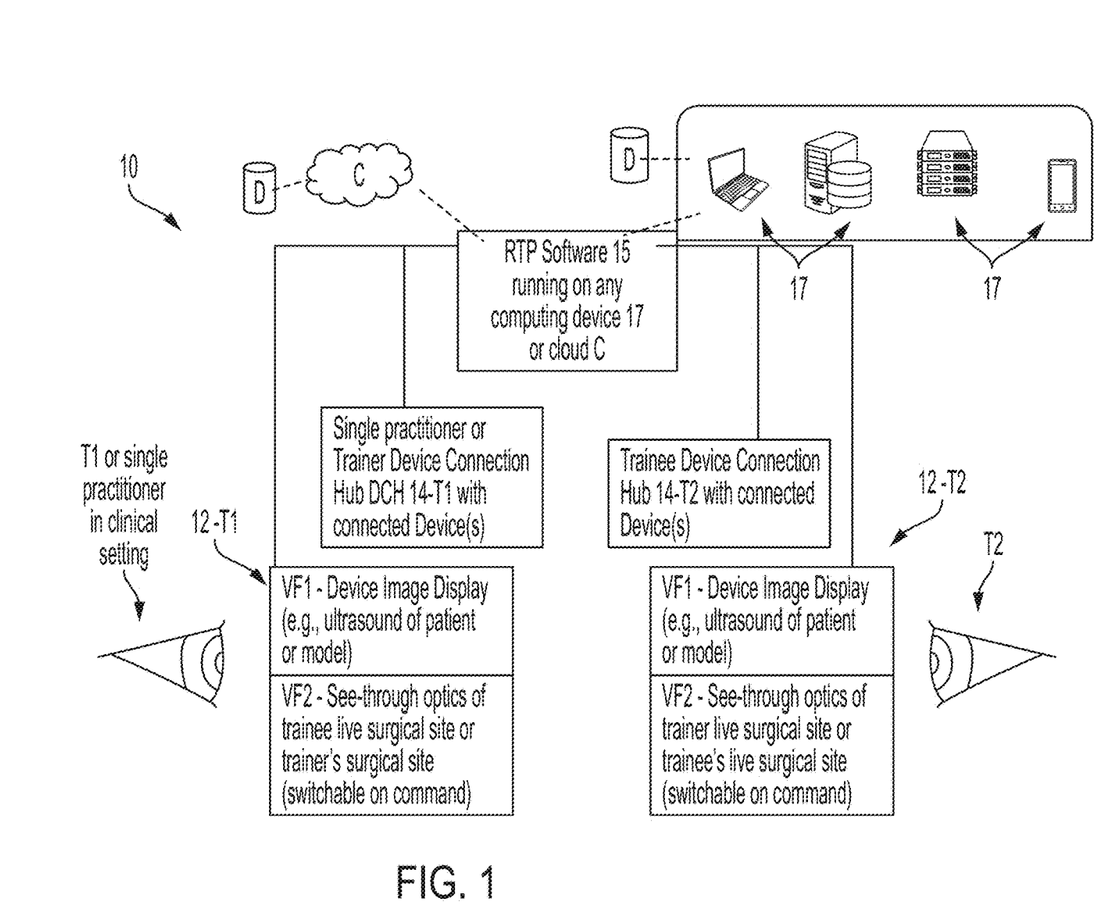
FIG. 1 is a schematic representation of an embodiment of the invention.

Referring to FIG. 1, in a preferred embodiment of the invention, surgical training apparatus, system and methods designated generally by the reference numeral 10 are provided which utilize three main components in the form of an augmented reality (AR) headset 12 with see-through-optic display and imaging array, a device(s) electronics hub 14, and telecommunication software 16. In an embodiment involving a single practitioner in a clinical setting, all that is required is a single AR headset with associated device connection hub and a computer running the RTP Software which connect to the AR headset and device connection hub. In a training embodiment, a Trainer with one or more Trainees are each provided with an AR headset, a device connection hub and a computer running the RTP Software as described more fully below.

The AR headset 12 allows one or more Trainees T2, T3 . . . . TN wearing a respective AR headset to see what the Trainer T1 sees through the Trainer T1 imaging array and allows each Trainee T2, T3 . . . . TN to view training materials and/or the Trainer's T1 viewpoint.

Each AR headset 12 (one for each of T1, T2, T3 . . . . TN) may include a speaker 12a and a microphone 12b that permit two-way communication between the Trainer T1 and each Trainee. Respective Trainer/Trainee AR headsets are identified in the drawing by the notations 12-T1, 12-T2, 12-T3, etc. to indicate the AR headset of the Trainer T1 and each Trainee T2, T3 . . . . TN, respectively.

Figure 2:
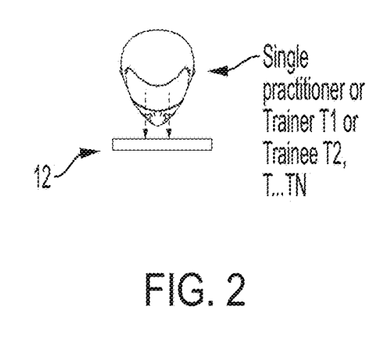
FIG. 2 is a simplified schematic showing a top plan view of a practitioner, Trainer or Trainee with an AR headset with laser illumination.

Each AR headset 12 is associated with a respective device connection hub or "DCH" 14 seen in FIG. 2. Each DCH 14 allows plug-and-play connectivity for one or more medical or other devices (which may include operation for two or more devices simultaneously), camera, imaging or other peripheral device used during surgery or any other complex procedure. In the particular embodiment shown and described herein, the device is an ultrasound wand 16 connected to DCH 14 plug receptacle 14a which accepts device plug 16a as seen in FIG. 2.

DCH 14 may be an embedded device which preferably runs local software as it may be behind a firewall particularly within medical institutions due to their standard computer security protocols. As seen in FIG. 2, the DCH software may connect to the Cloud C so as to receive periodic downloads of updated DCH software through a CI/CD (Continuous Integration, Continuous Development) server hosted in the Cloud C.

A Trainee's (one or more of T2, T3 . . . . TN) live (real time) interactions with a connected device(s) such as device 16 may be broadcast via their respective AR headset 12-T2 (imaging array data) to the AR headset 12-T1 of a remotely located Trainer T1 who sees the Trainee's T2 actions through the Trainer's AR headset 12-T1 optic display or a traditional computer display.

The RTP Software allows the simultaneous display of the aforementioned image and/or video feeds which may be selectively arranged in the AR headset so as to not obscure the view of the surgical field and thus maximize the Trainer and Trainee interactions with said devices.

The RTP Software also allows the Trainer to selectively message and/or play surgical scenario critical video, imaging and/or text/annotation content in the AR display of the Trainee.

In an embodiment of the invention, the AR headset imaging array may be operable to reconstruct a 360 degree view around the Trainer or a Trainee field of view, allowing the Trainer or Trainee to virtually "walk" around the Trainee's or Trainer's position, respectively, so they can observe the other's work and what the other sees in real time. This feature virtually puts the Trainer or Trainee in the room with the other.

The AR headset 12 may include any one or more but preferably all of the following features or their equivalents:
1K, 2K, 4K, 8K or higher resolution Projected Display Waveguide with monocular or binocular see-through-optic(s)
    WiFi & Bluetooth Connectivity (or other connectivity methods such as ultrasonic, thermal imaging, sound waves or others within the electromagnetic spectrum)
    Digital Camera(s)
    Single or multi core embedded CPU and or GPU
    Right or Left Eye Monocular or Left and Right binocular
    Haptic Feedback
    Voice Control
    Embedded OS
    Noise Cancelling Microphone
    On Board Video Recording Media with marking capability and playback The AR headset 12 may be wired or wirelessly connected to a computing device 17 which may be in the form of a computer, smart phone, tablet or other computing device running the RTP Software 16 as a downloaded software application ("app"), for example. The RTP Software 16 may also be hosted remotely in the "cloud" C and provided to a user as Software as a Service (SaaS). Any other computer types may be used such as tablets, laptops, desk tops, virtual desk top, smart phone, etc., whereon the RTP Software may be installed or accessed as a SaaS. The RTP Software 16 may be programmed to present to the user a login screen on device 17, separate monitor (not shown) and/or AR headset 12 wherein the user may have a password protected data file which will store the user's live clinical session or surgical training session data for later retrieval and/or playback. The RTP Software 16 may connect to other servers and/or networks such whereby the user's RTP Software file may be connected to the user's personal (e.g., student) data files hosted on, for example, the user's medical school, or medical device company's server. As such, the user's time spent on simulated surgical training may be logged for the user's class credit or other purposes.

Exemplary embodiments of the overall architecture including the device connection hub 14 elements include but are not limited to the following:

Use Case 1—AR Headset 12 is a peripheral of the laptop/desktop computer; See through optic is an extended display and the headset camera is like a webcam.
1A.1 (Headset) Internet AR cloud with bidirectional communication wired or wireless link with bidirectional communications to laptop/desktop computer with bidirectional communications to AR Headset.
1A.2 (Hub) Internet cloud with bidirectional communications wired or wireless link with bidirectional communications to laptop/desktop computer with bidirectional communications to device connection hub.

Use Case 2—No Laptop/desktop computer; AR Headset is connected directly to the Hub.
2A Internet cloud with bidirectional communications to wired or wireless link with bidirectional communications to Hub with bidirectional communications to wired or wireless link with bidirectional communications to AR Headset with embedded computer.
2B Internet cloud with bidirectional communications to wired or wireless link with bidirectional communications to Hub with embedded computer with bidirectional communications to wired or wireless link with bidirectional communications to AR Headset.
2C.1 Internet cloud with bidirectional communications to wired or wireless link with bidirectional communications to hub with embedded computer.
2C.2 Internet cloud with bidirectional communications to wired or wireless link with bidirectional communications to AR Headset.

Use Case 3—Stand Alone clinical medical device, with degradation mode direct connection to Internal Institutional server.
3A Institutional internal server (Assumes firewalled internet connection is available) with bidirectional communications to wired or wireless link with bidirectional communications to Hub with embedded computer with bidirectional communications to wired or wireless link with bidirectional communications to AR Headset.
3B Institutional internal server (Assumes firewalled internet connection is available) with bidirectional communications to wired or wireless link Hub with embedded computer with bidirectional communications to wired or wireless link with bidirectional communications to AR Headset.
3C Institutional internal server (Assumes firewalled internet connection is available) with bidirectional communications to wired or wireless link with bidirectional communications to Hub with embedded computer with bidirectional communications to wired or wireless link with bidirectional communications to AR Headset with embedded computer.
3D.1 Institutional internal server (Assumes firewalled internet connection is available) with bidirectional communications to wired or wireless link with bidirectional communications to AR Headset with embedded computer.

3D.2 Institutional internal server (Assumes firewalled internet connection is available) with bidirectional communications to wired or wireless link with bidirectional communications to Hub with embedded computer.

Use Case 4—Stand Alone clinical medical device, with degradation mode direct connection to federated server (server where anonymous images and/or data may be stored or retrieved. Mainly used for building machine learning models but could be other uses).

4A federated server (Assumes firewalled internet connection is available) with bidirectional communications to wired or wireless link with bidirectional communications to Hub with embedded computer with bidirectional communications to wired or wireless link with bidirectional communications to AR Headset.

4B federated server (Assumes firewalled internet connection is available) with bidirectional communications to wired or wireless link with bidirectional communications to Hub with embedded computer with bidirectional communications to wired or wireless link with bidirectional communications to AR Headset.

4C federated server (Assumes firewalled internet connection is available) with bidirectional communications to wired or wireless link with bidirectional communications to Hub with embedded computer with bidirectional communications to wired or wireless link with bidirectional communications to AR Headset with embedded computer.

4D.1 federated server (Assumes firewalled internet connection is available) with bidirectional communications to wired or wireless link with bidirectional communications to AR Headset with embedded computer.

4D.2 federated server (Assumes firewalled internet connection is available) with bidirectional communications to wired or wireless link with bidirectional communications to Hub with embedded computer.

Use Case 5—Stand Alone clinical medical device, allowing see-through vision as described above, with degradation mode direct connection to federated server.

5A federated and internal server (Assumes firewalled internet connection is available) with bidirectional communications to wired or wireless link with bidirectional communications to Hub with embedded computer with bidirectional communications to wired or wireless link with bidirectional communications to AR Headset.

5B federated and internal server (Assumes firewalled internet connection is available) with bidirectional communications to wired or wireless link with bidirectional communications to Hub with embedded computer with bidirectional communications to wired or wireless link with bidirectional communications to AR Headset.

5C federated and internal server (Assumes firewalled internet connection is available) with bidirectional communications to wired or wireless link with bidirectional communications to Hub with embedded computer with bidirectional communications to wired or wireless link with bidirectional communications to AR Headset with embedded computer.

5D.1 federated and internal server (Assumes firewalled internet connection is available) with bidirectional communications to wired or wireless link with bidirectional communications to AR Headset with embedded computer.

5D.2 federated and internal server (Assumes firewalled internet connection is available) with bidirectional communications to wired or wireless link with bidirectional communications to Hub with embedded computer.

Image Devices which may provide a real time image video feed to the Device Connection Hub include, for example, ultrasound, endoscope, laparoscope, etc. These same devices may also provide a static image capture, if desired. Devices which may provide static images which may, for various reasons, not be possible to use inside the surgical procedure room and use of such real-time and static images in conjunction with the invention are discussed further below.

Figure 6:
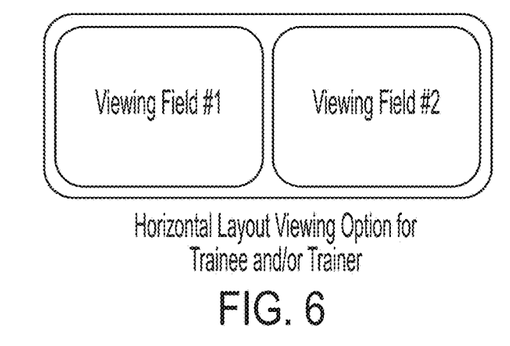
Figure 7:
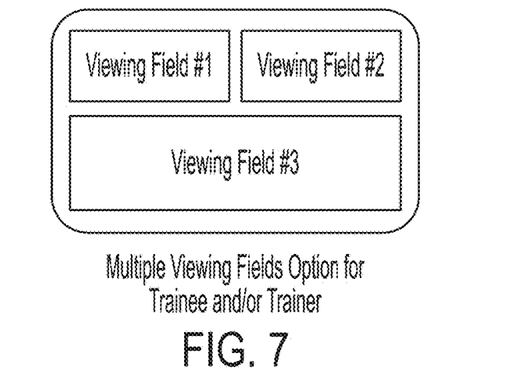
Figure 8:
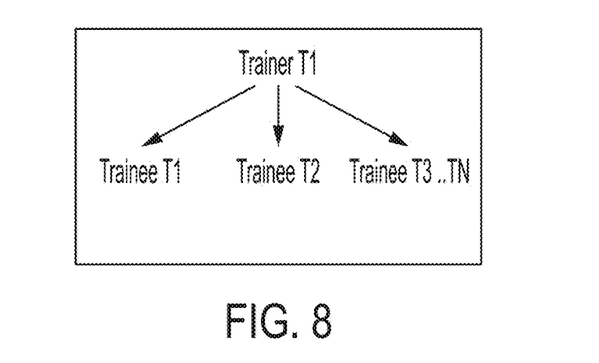
FIG. 8 shows a simplified schematic illustrating a single Trainer training multiple Trainees at the same time.
Figure 9:
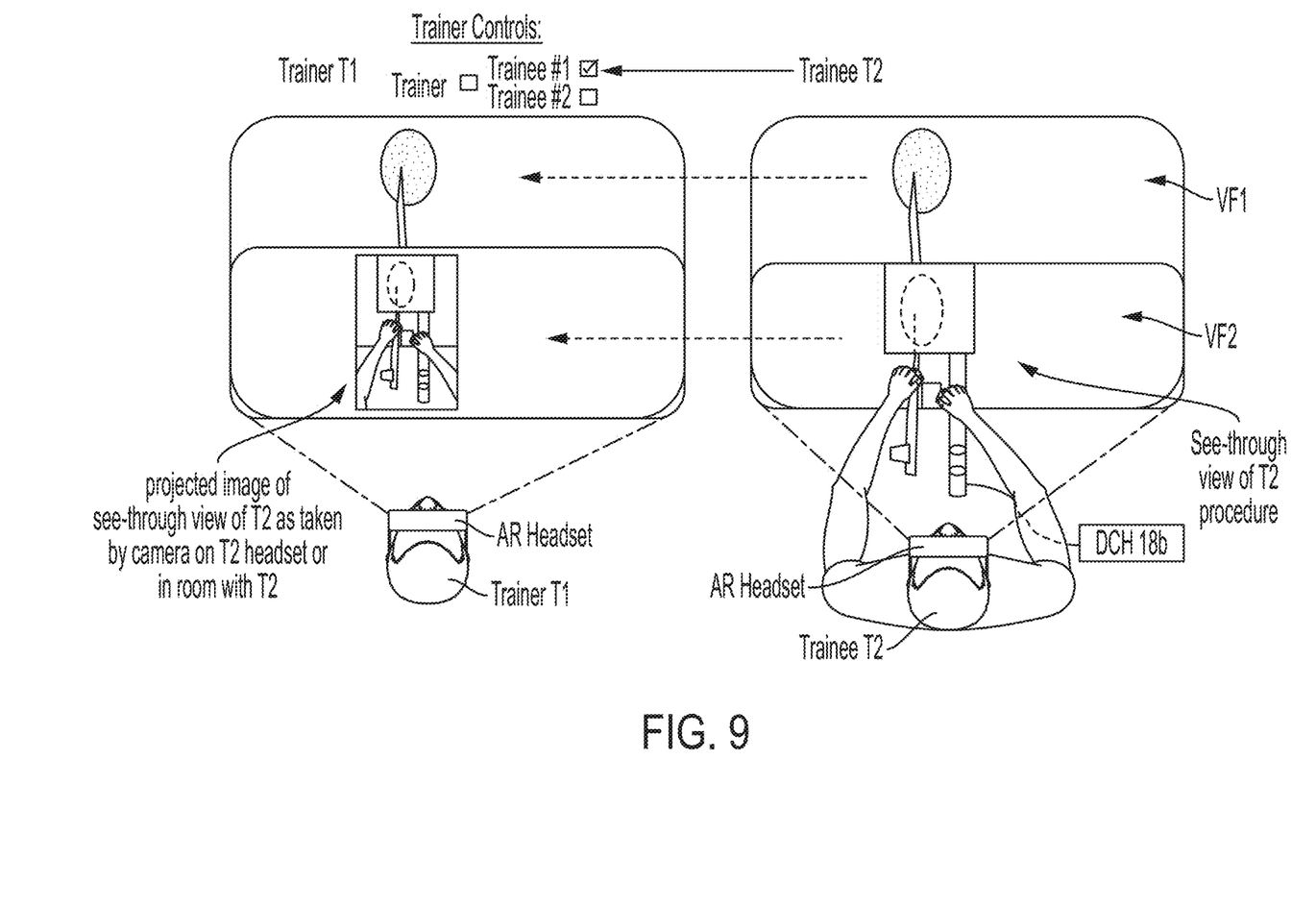
FIG. 9 is a simplified schematic showing a Trainer and Trainee with respective AR headsets performing a surgical procedure using the Trainee view mode.
Figure 10:
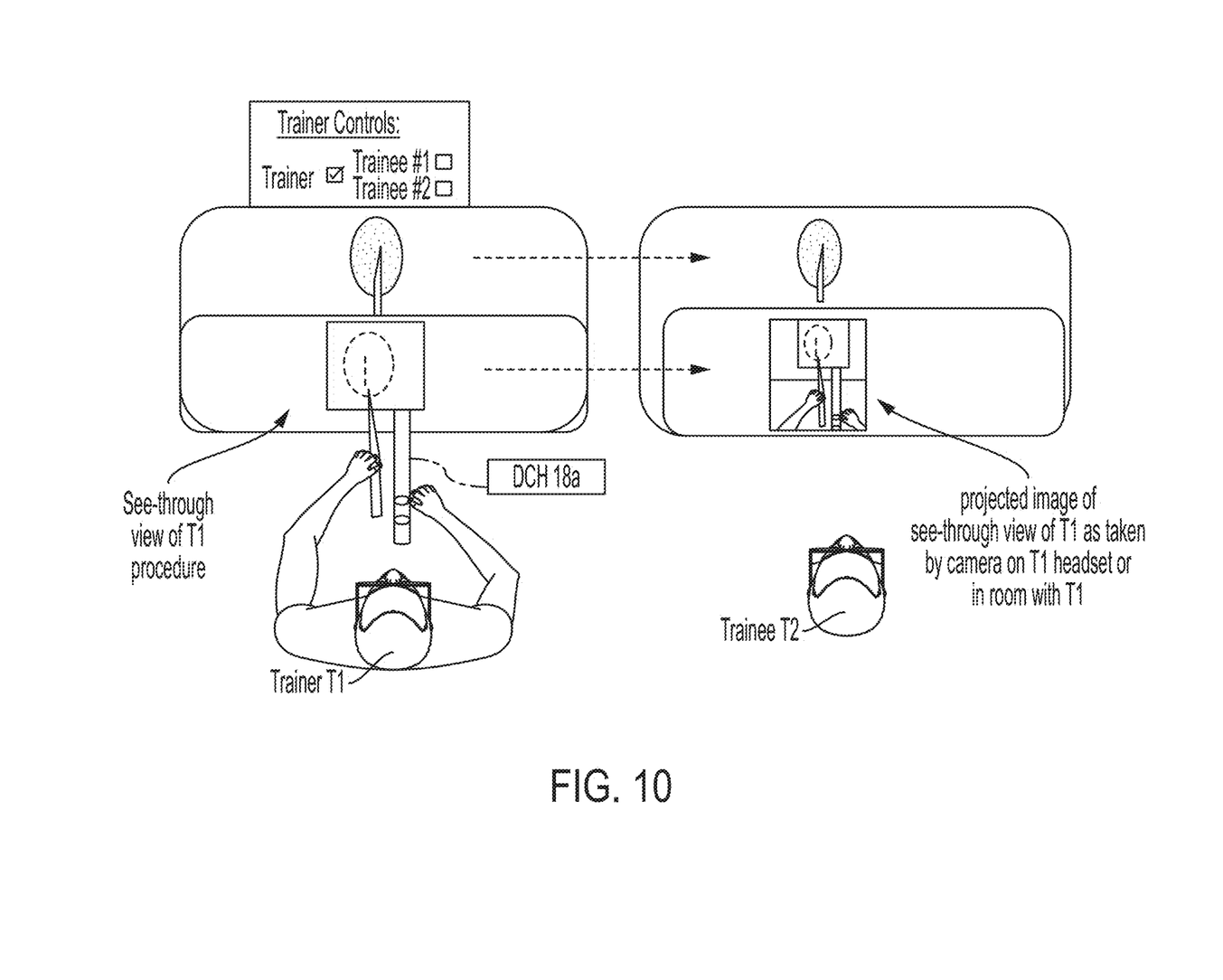
FIG. 10 is a simplified schematic showing a Trainer and Trainee with respective AR headsets performing a surgical procedure using the Trainer view mode.
Figure 11:
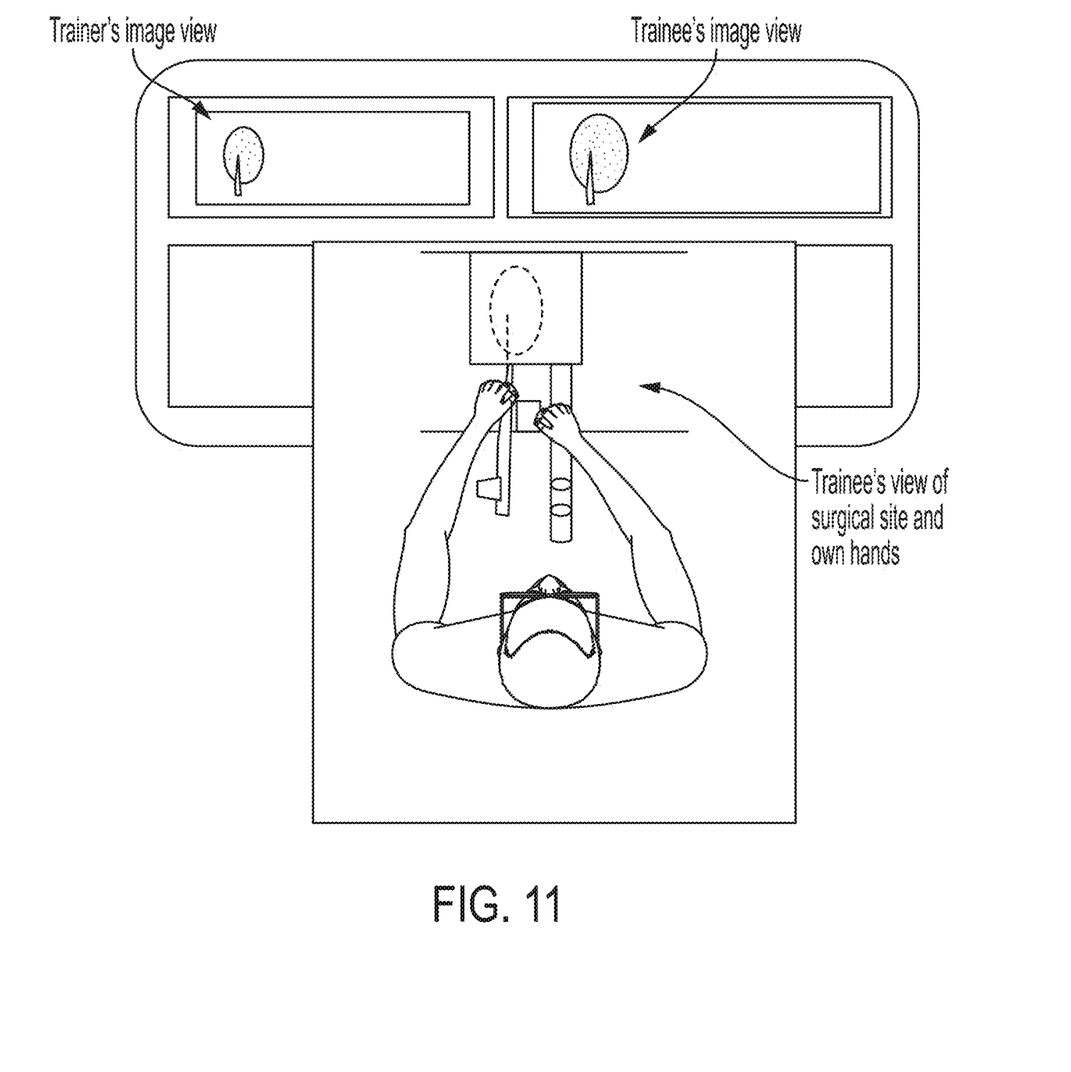
FIG. 11 is a simplified schematic showing an example of the AR headset of FIG. 7.

Image display on the AR headset could be controlled and arranged differently for different procedures/specialties. For example, the Device Image may be located adjacent the upper edge of the AR View Panel while the see-through optics is located adjacent the lower edge of the AR View Panel (see Trainee T2 in FIG. 9 and Trainer T1 in FIG. 10). The Device Image and the see-though optics may also be arranged side-by-side (see FIG. 6). Furthermore, more than one Device Image (e.g., from two different devices) may be displayed on the View Panel (see FIG. 7).

Controls provided by the software may allow the Trainee and/or Trainer (or single practitioner) to switch between different Device Images, other visual feeds (e.g., a video feed sent to Trainee by Trainer or retrieved from database D (FIG. 1), etc.) and image view placement options for the see-through optics and different video feeds.

Such controls may allow the user to perform image adjustments such as, for example, image cropping, resizing, resolution adjustment, color balance adjustment, scaling, mirroring, rotation and horizontal or vertical image flipping.

For devices that cannot be used during the procedure, images may be obtained prior to the procedure or during the procedure and electronically sent or otherwise downloaded to the Device Connection Hub for on-demand retrieval by the Trainee and/or Trainer. Furthermore, some imaging devices are mobile and may be brought into the surgical procedure room and used during a momentary stop in the procedure (e.g., X-Ray machines and scanners).

Controls may be provided to allow the trainee and/or trainer to select one or both modality of static and real time image feeds.

The invention thus provides a system for providing communication between a trainee and a remote trainer of a procedure, said system comprising:

a) first and second headsets wearable by the trainee and remote trainer, respectively, each of said headsets having a viewing pane operable to simultaneously allow visualization by the wearer of at least two viewing fields where a first viewing field is a see-through lens allowing the wearer to see a live procedure field located adjacent the wearer and the a second viewing field is an image received by the headset as an electronic signal;

b) first and second device connection hubs connected to said first and second headsets, respectively, each of said hubs operable to receive an image from at least one imaging device;

c) a software program having telecommunication operability and accessible by each said first and second headsets and operable to project said image in said second viewing field.

The first and second viewing fields may be positionally arranged in the AR headset viewing pane in one of vertically or horizontally adjacent to each other.

First and second device connection hubs and/or respective AR headsets may connect to software operable to perform signal processing on an image received from at least one imaging device.

The procedure being performed may be a surgical procedure on a patient.

The software may be operable to allow a trainer to send an image from the trainer headset to one or more trainee headsets.

The software may be operable to allow the trainer to send an electronic data file to one or more trainee headsets and the electronic data file may include one or both of text and video.

The software may be operable to allow the trainer to selectively view either one of the first and second viewing fields of one or more trainee headsets.

The software may be operable to allow the trainer to cause the selected trainee one or more viewing fields to be displayed on non-selected trainee headset viewing fields.

The headset may be an augmented reality headset or a combination of virtual and augmented reality.

The software may be operable to allow selective audio communication between the trainee and trainer and the audio communication may be connected to a respective headset.

a) One or more cameras may electronically connect to one or both headsets.

b) One or more cameras may be located on a respective headset.

c) Three or more headsets may be provided for use by three or more trainees. AR headset software may be provided operable to selectively control one or more of AR headset image resolution, color balance, cropping, resize, placement, scaling, mirroring, rotation and horizontal and vertical flipping.

Turning attention now to FIGS. 12-21, in further embodiments the present invention enhances the use of an augmented reality (AR) headset in two dimensional (2D) or three dimensional (3D) video presentation during the exemplary case of remote surgical training by providing a means of highlighting the area of interest (AOI) within the line of sight (LOS) of the surgical field. Additionally, methods for tracking such that the AOI is always within the line of sight of the surgical field is transmitted to the remote student or instructor. Additional enhancements to the AR headset are necessary since headsets and eyewear are used for illumination and/or magnification of the surgical field or AOI, and only one single function headset can be worn at a time. Additional enhancements including the ability to convert the AR headset to virtual reality (VR) has some key advantages when performing tasks viewing a remote camera, such as an endoscope, or watching an instructional video prior to performing the procedure locally for the task at hand. Usually, these range of features are mutually exclusive.

Since the surgeon is already wearing a near eye display and line of sight camera, these features can be combined and modified, thus enhancing the utility and functionality of the head worn display. The present invention thus comprises in a further embodiment a multifunctional headset providing these features. These features described above and further below are designed to enhance the work environment for any type of procedure, be it during maintenance, shop floor, law enforcement situation or a strict ordered procedure, for example. Furthermore, in addition to the native RTP Software serving as the functionality of the embodiments described above, the controller can contain software for a specific application. For example, dental digital reconstruction software can be housed within the controller that allows the user to use the headset as an accessory monitor with its see through vision capabilities and operate a dental scanner to generate a digital reconstruction of the mouth for the purposes of creating an appliance.

Figure 3:
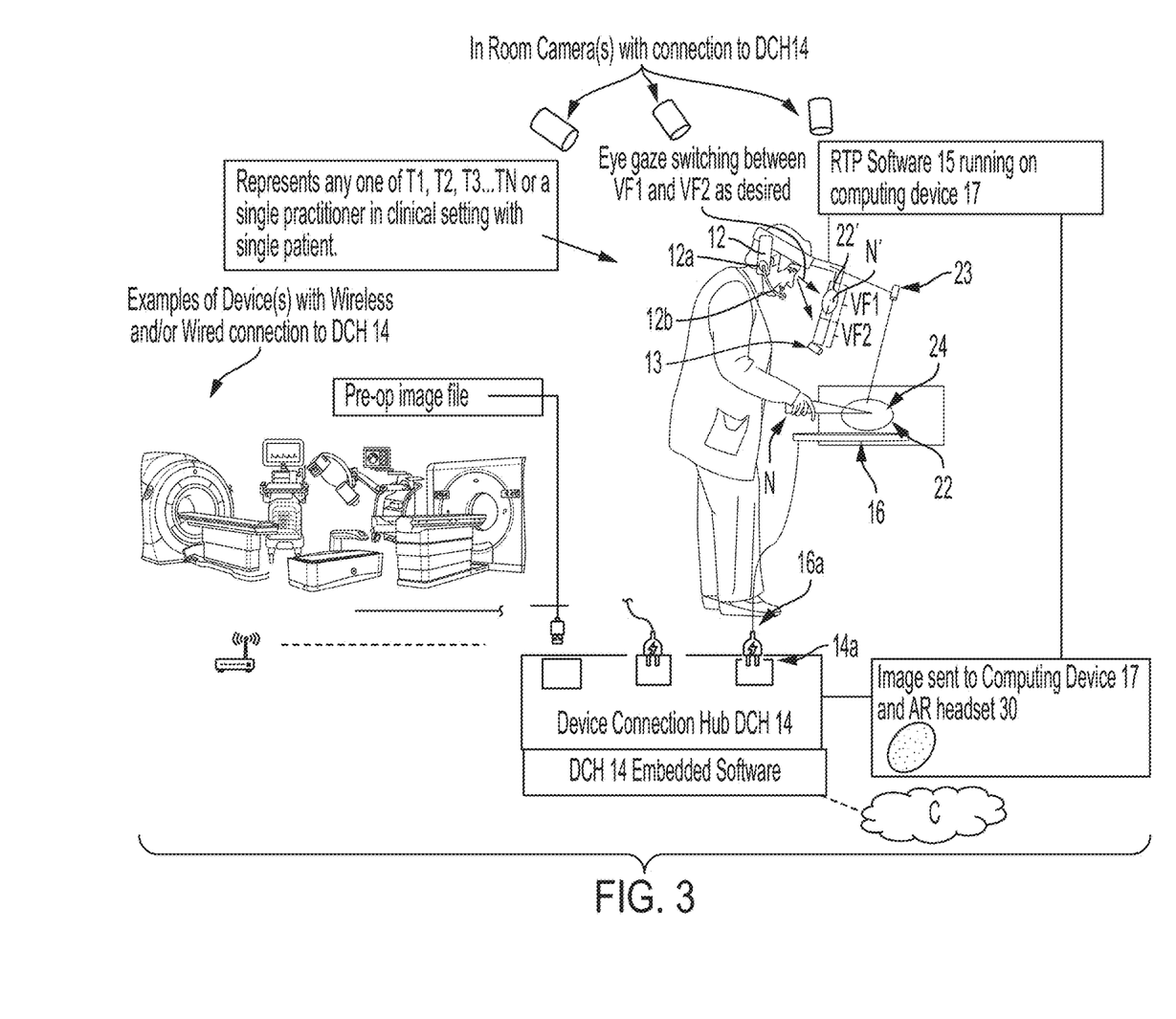
FIG. 3 is a schematic of a practitioner, Trainer or Trainee performing a surgical procedure utilizing apparatus, system and methods of an embodiment of the present invention.
Figure 4:
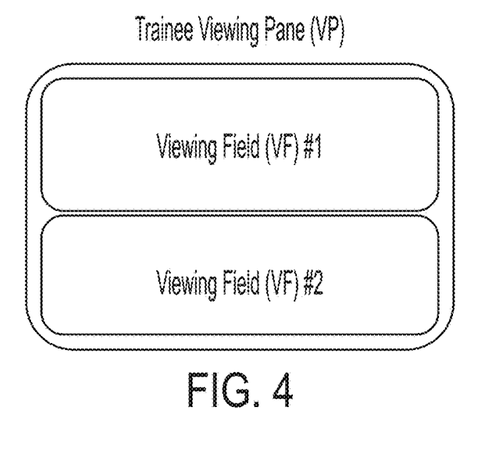
FIGS. 4-7 show various possible AR headset viewing field layouts.
Figure 5:
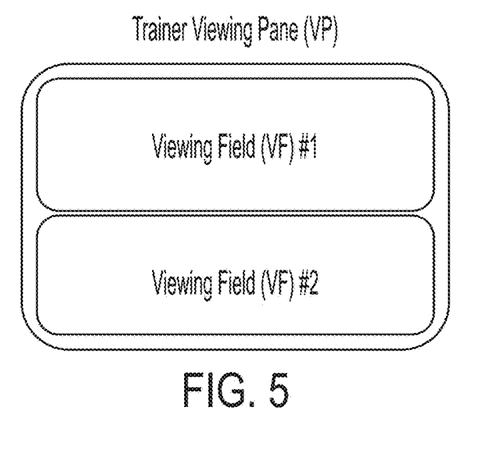
Figure 12:
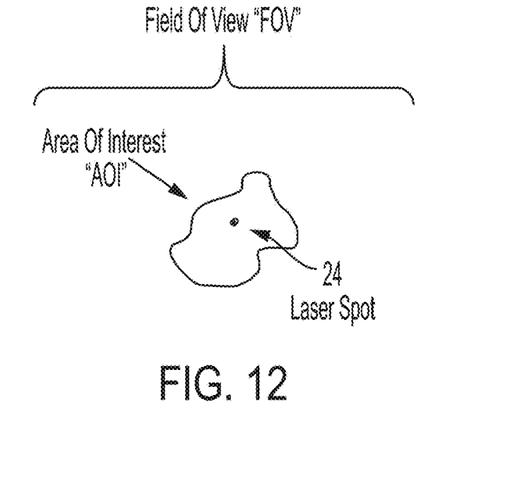
FIG. 12 is a simplified schematic showing the AR Headset FOV as seen through AR headset and the laser spot pointing to an AOI within the FOV.

Turning attention to FIGS. 3 and 12, AR headset 12 may include a laser pointer 23 with the laser spot 24 pointing to an Area Of Interest (AOI) within the Field of View (FOV) as seen through the AR headset 12. A physical laser illumination method mounted to the headset 12 and aligned with the headset camera 13, provides a visible indicator that the similarly mounted 2D or 3D camera FOV is within the targeted area to both Trainer and Trainee so both can indicate to each other an area of interest (AOI). To provide guidance, the center of the LOS can be illuminated as a single point to visually direct the wearer to look at center 2D or 3D FOV in the AOI. Furthermore, this allows an instructor/Trainer wearing the headset 12 to point to specific elements within the environment, AOI and FOV for enhanced instruction.

It is desirable to ensure the head-mounted camera FOV is over the subject matter and allows the instructor/Trainer to confirm the FOV is transmitted to a remote student/Trainee. The physically mounted pointing mechanism may be provided by several different physical techniques. For example, the physically mounted pointing mechanism could be in the form of visible light, sound or thermal means where the headset includes a queue receiver operable to convert the pointing mechanism to the visible spectrum in the see-though optic to give the wearer the appropriate feedback.

Rather than a physical form or energy as described above, the indication could be a virtual one in heads-up display see-through display. The pointer could be in the form of brackets within the margins of the AOI so the presenter knows that it is within the camera FOV. This indication method could be brackets of any shape or a single indicator pointer dot, or "Line of Sight instruction point" (LOSIP).

In a further embodiment, the four corners of the FOV could "bracket" the AOI with a geometric shape which would envelop or surround the AOI. Any suitable shape may be used such as, for example, a square bracket, a circle, ellipse, or a complex polygon or object outline which will highlight the AOI.

Figure 13:
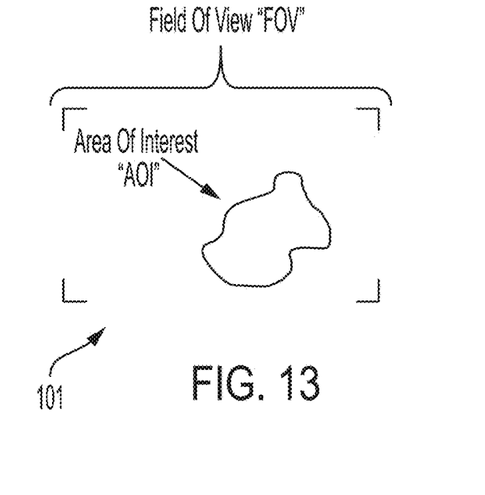
FIG. 13 is a simplified schematic showing the AOI with square brackets projected within the Line of Sight Field Of View (LOSFOV)

FIG. 13 illustrates the option of visually delineating the FOV with four corner brackets 101 which may be projected in the AR headset 12 with the AOI located within the FOV.

Figure 14:
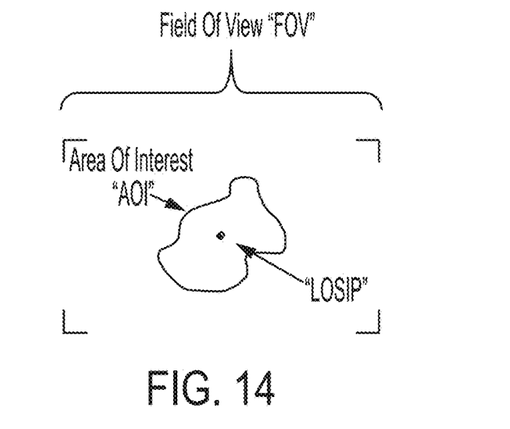
FIG. 14 is a simplified schematic showing the AOI centered within the FOV, and shows the LOS instruction point (LOSIP) in the center of the FOV indicating that the person wearing the head worn display has the AOI perfectly centered within the FOV.

FIG. 14 shows an embodiment with the AOI centered within the FOV and the LOS instruction point ("LOSIP") in the center of the FOV indicating that the person wearing the head-mounted display 24 has the AOI perfectly centered within the FOV.

In yet a further embodiment, instead of using a fixed physical or virtual marker enveloping or pointing to the center LOS of the AOI physical location, image processing or machine learning methods could be provided in the form of, for example, the tip of a glove, barcode or other trackable object, to center the FOV of the camera on the detected object.

In yet another embodiment the pointer can act as a ruler or other measuring device and can function in X-Y or X-Y-Z directions.

Figure 15:
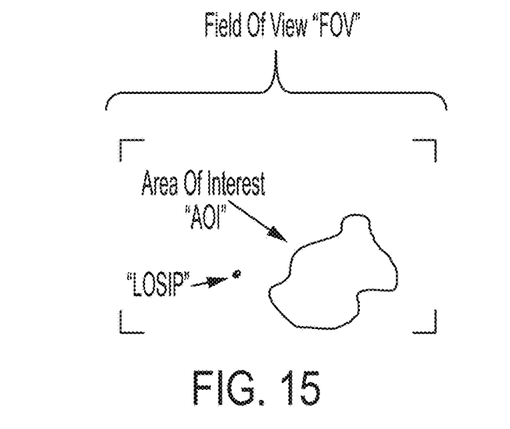
FIG. 15 is a simplified schematic showing the AOI off-centered low and to the left within the FOV, and shows the LOSIP in the lower left quadrant of the FOV indicating that the person wearing the head worn display is not centered within the FOV.

FIG. 15 shows an embodiment with the AOI off-centered low and to the left within the FOV, and further showing the LOSIP in the lower left quadrant of the FOV indicating that the person wearing the headset 12 does not have the head-mounted display 24 centered within the FOV.

Since the center of the FOV can be detected by the methods proposed above, it is possible to direct the wearer to center the FOV on the detected object by using direction arrows or by displaying a small virtual rectangular or circular LOSIP, which shows the wearer the location of the center of the FOV wherever the camera is pointed. Other means for providing direction to the wearer may be used such as visually perceivable arrows directing the wearer to look by moving their head to the left, right, top, or bottom.

Figure 16:
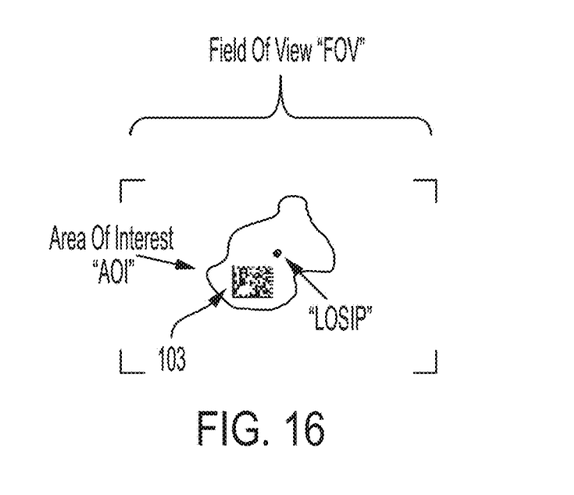
FIG. 16 is a simplified schematic showing a mechanism to center the AOI in the FOV utilizing machine tracking of a barcode.

FIG. 16 is a simplified schematic showing a mechanism to center the AOI in the FOV utilizing machine tracking of a barcode 103 placed on the AOI (e.g., phantom), a machine or other item or device to direct the attention of the Trainer to that spot. Should the Trainee want to indicate to the Trainer a specific location, for example a button on an ultrasound machine, and does not want to manually adjust the optical bench or laser embedded in the headset to make sure both the Trainee and Trainer are looking at the same location. Each location of interest can have a barcode 103 or other indicator whereby the Trainee's headset will recognize that location and adjust the headset to assure the Trainer is looking at the same spot. To accomplish this there needs to be a feedback loop whereby the barcode 103 is recognized by an element within the headset 12, which will then mechanically adjust the optical bench and laser so that the location is within the center of view. An example of this function could be the laser is aimed at the barcode 103, which then emits a signal (light, electromagnetic, or other) which activates a receiver within the headset 12, which in turn sends a signal to a motor to activate a gear(s) to move the headset so the location is centered in the FOV. The motor can activate any number of mechanisms including slides, tabs, or others. In addition to mechanical gears movement can be initiated by magnets or other electromagnetic actions. In one embodiment, the Trainee may need to push a button on the controller while keeping the laser centered on the location. Once the headset achieves the right configuration (movement of both optical bench and laser) the Trainee releases the button. In another embodiment, the Trainee can use hand gestures which are activated by software representing the button pushing function.

Figure 17:
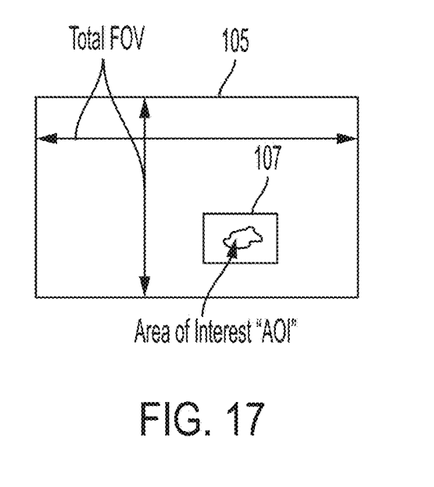
FIG. 17 is a simplified schematic of the total field of view, and shows a sub region that that is being presented to the wearer of the headset, which represents a zoomed in view of the AOI.

In yet a further embodiment, rather than using optical means of achieving magnification, the enhanced AR headset includes the selective use of a digital zoom provided by a wide-angle lens cameras and a high mega-pixel-based zoom to show the AOI. For example, if 100 Mega-Pixel digital cameras were used with a wide-angle lens of 180 degrees, a 2000-pixel by 1000-pixel image would only occupy two percent (2%) of the available viewing area. FIG. 17 shows an embodiment with the total FOV defined by rectangle outline 105 and including a focused sub-region 107 which includes a zoomed-in view of the AOI that may be viewed through headset 12.

When the head-mounted camera image is displayed in the see-through optic, it can act as a "Digital Loupe" providing magnification of the AOI. The loupe function may be added to the multifunctional headset and in this way provide an AR Headset for surgical AOI magnification. This feature may be useful in many other applications in manufacturing, mechanical assembly/repair, or other fields including law enforcement, for example.

Figure 18:
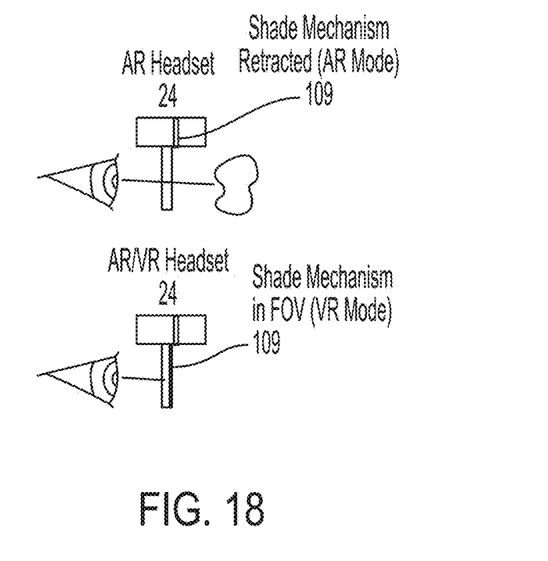
FIG. 18 is a simplified schematic showing a mechanical shade mechanism retracted (top half of the figure) which would mean that the wearer is observing in AR Mode. The lower half of the figures shows the shade extended, which means that the wearer is utilizing virtual reality (VR) mode.

In yet a further embodiment, another feature added to the multi-function head mounted display includes the ability to create a hybrid AR/VR system, by using a mechanical black background which only allows less than ninety-five percent (95%) light within the FOV through to the wearer's eyes. The black background cover is inserted within the LOS of the near eye display. This allows the user to convert the AR system to a VR system. The VR system is useful for tasks such as viewing remote and/or endoscopic cameras or watching an instructional video prior performing a task, without having the distraction of the environment. FIG. 18 is a simplified schematic showing a mechanical shade mechanism 109 retracted (top half of the FIG.) which would mean that the wearer is observing in AR Mode. The lower half of the FIG. shows the shade mechanism 109 extended, which means that the wearer is utilizing VR model.

In another embodiment, the multifunction headset 12 may be provided with controls for all of the video feeds associated with the wearer, including head worn camera(s), imaging associated with the local procedure such as, for example, endoscopic, ultrasound, MRI, X-Ray, thermal imaging, etc. These video feeds can be presented as a remote virtual camera input commonly used in telecommunication software thus providing the remote participant(s) with a multifaceted view of the procedure being performed away from their physical location.

Figure 21:
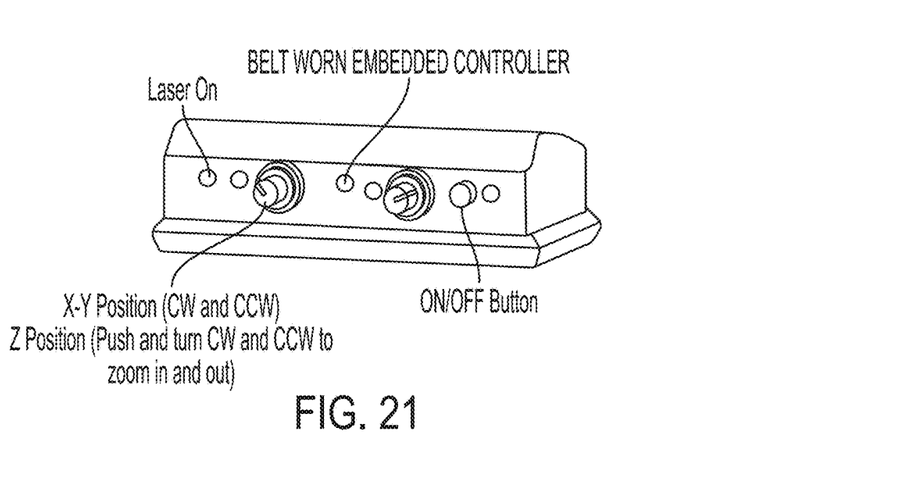
FIG. 21 is a simplified schematic showing the belt worn embedded controller, which can control the laser illuminator and can also direct a pointer in VR mode to an area of interest in the X-Y direction by turning the knob CW or CCW and the in and out of the Z Dimension by pressing the knob and turning CW and CCW, respectively.

In an embodiment, an embedded controller operable to selectively arrange video feeds to preferred positions is provided. As an alternative to using a laptop to control the number and arrangement of the video feeds, a belt worn controller of headset 12 may be used as seen in FIG. 21 which is a simplified schematic showing embedded controller 113 which is operable to perform one or more or a combination of functions including, for example, selective control of the laser pointer 23 (FIG. 3) to direct a laser pointer in VR mode to an AOI in the X-Y direction by turning the knob clockwise ("CW") or counter-clockwise ("CCW") and the in and out of the Z Dimension by pressing the knob and turning CW and CCW, respectively. Further options may be by hand gestures or by using a X-Y or X-Y-Z controller. Also, this feature can be automated by aiming webcam at a barcode or distinctive physical object such as the encasement enclosure of a simulated organ or organ system.

Figure 19:
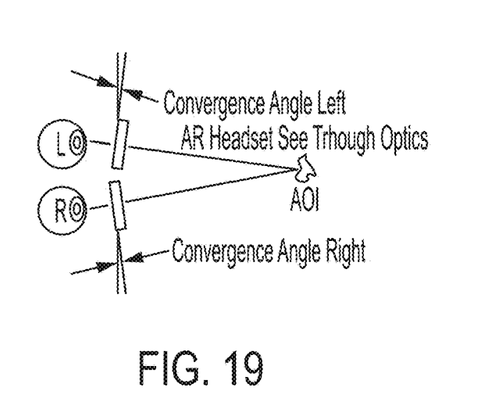
FIG. 19 is a simplified schematic showing the convergence angle of the AR waveguides, and distance to the Angle of Interest.
Figure 20:
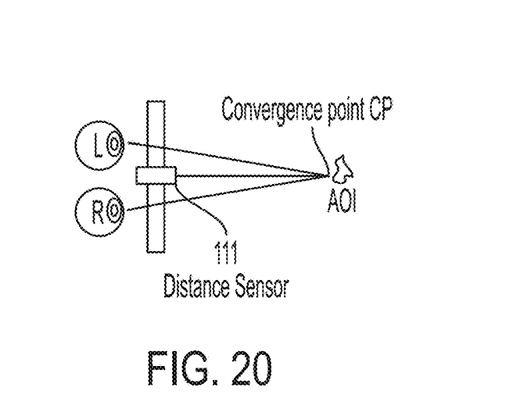
FIG. 20 is a simplified schematic showing the convergence point for which the distance to the FOV is sensed by distance sensor shown in the figure.

In another embodiment, a built-in mechanism to adjust the convergence of see-through optic waveguides may be provided. Using webcam, point at the desired distance, and a distance sensor to automatically or manually through a push button on the controller to adjust the convergence point. The lenses will then angle to converge at that point. Changing the angle of the lens will require a mechanical function to physically move them. The mechanism to do this has been described in [000105]. Diopters for correction can be performed electronically by warping the image to the desired correction values. Correction values of either the diopter or convergence can be encoded on a logo embedded on a phantom enclosure or case. FIG. 19 is a simplified schematic showing the left and right convergence angles of the AR waveguides, and distance to the AOI. FIG. 20 is a simplified schematic showing the convergence point "CP" for which the distance to the FOV is sensed by distance sensor 111 which may be mounted to headset 12.

When using an endoscope, hand gestures or an X-Y controller may be used on a belt worn pack to highlight or point to a particular feature in the video as explained above. The webcam with laser indicator works well outside of the phantom/body but there may still be a need to rely on annotations which are cumbersome and slow. For example, a student Trainee performing a cystoscopy sees a small lesion and wants that lesion to be highlighted for the Trainer to know he is looking at the same lesion. By using hand gestures or by using a X-Y or X-Y-Z controller on a belt worn controller the annotation can be made at the desired location on the video feed.

FIG. 20 is a simplified schematic showing the convergence point for which the distance to the FOV is sensed by distance sensor shown in the figure.

FIG. 21 is a simplified schematic showing the belt worn embedded controller, which can control the laser illuminator and can also direct a pointer in VR mode to an area of interest in the X-Y direction by turning the knob CW or CCW and the in and out of the Z Dimension by pressing the knob and turning CW and CCW, respectively.

Figure 22:
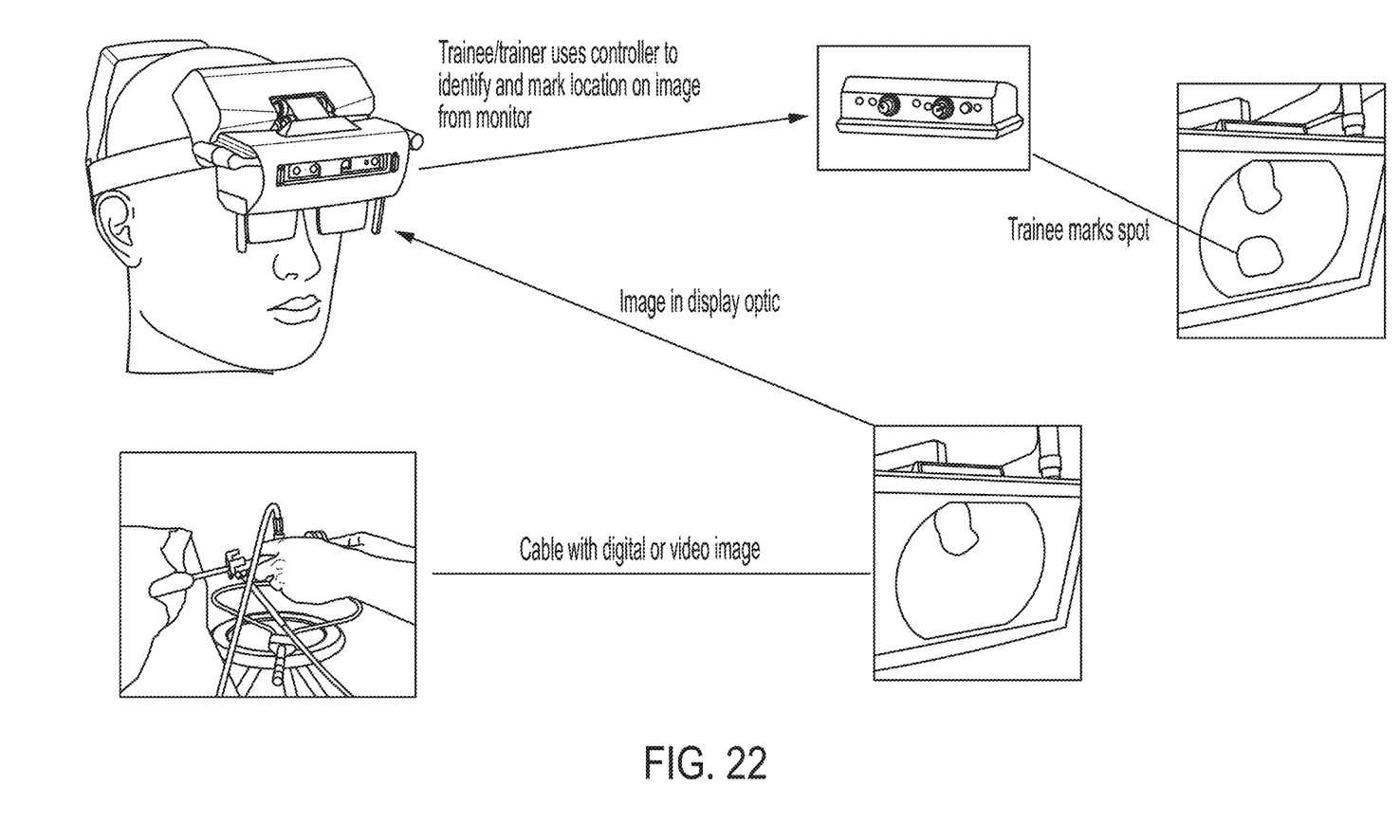
FIG. 22 is a simplified schematic showing a pointer which can be displayed on an image collected from a digital camera attached to an endoscope. The pointer allows the trainer to highlight a specific area on the video image and can be controlled by the software or from a dedicated position on the controller.

FIG. 22 is a simplified schematic showing a pointer which can be displayed on an image collected from a digital camera attached to an endoscope. The pointer allows the trainer to highlight a specific area on the video image and can be controlled by the software or from a dedicated position on the controller.

While the apparatus, methods and systems of the invention have been shown and described with reference to certain preferred embodiments thereof, it will be understood by those skilled in the art that various changes in form and details may be made therein without departing from the spirit and scope of the invention as described. For example, while the invention is described herein within the context of surgical procedures, it is to be understood that the invention may be applied to other fields of endeavor which require advance skill (e.g., ordinance disposal, construction, underwater operations, tactical operations, etc.).

What is claimed is:

1. A system for providing communication between a trainee and a trainer of a procedure, the system comprising:
   a headset wearable by the trainee and being configured to communicate with a trainer computing device, the headset having a mounted camera oriented to capture a Field of View (FOV) corresponding to the viewable area in front of the trainee, the headset also having a viewing pane that is at least partially transparent such that the viewing pane may selectively 1) display augmented reality images which partially obstruct vision of objects physically beyond the viewing pane, and 2) enter a transparent state displaying no virtual images and no augmented reality images, wherein the headset and the computing device coordinate to transmit augmented reality images, wherein the objects physically beyond the viewing pane comprise a live procedure adjacent to the headset or the computing device; and
   a trainee pointer in the headset and a trainer pointer associated with the computing device, the trainee pointer and trainer pointer enabling the trainee and trainer to indicate to the other an Area of Interest (AOI) within the FOV relative to the live procedure, wherein the headset is configured to display in the viewing pane a boundary of the AOI, the headset and computing device being configured to communicate with one another whether or not the FOV of the headset is oriented toward the AOI.

2. The system of claim 1 wherein the trainee pointer or trainer pointer is a laser pointer.

3. The system of claim 1 wherein the trainee pointer and the trainer pointer are selectively activated by the trainee and trainer, respectively.

4. The system of claim 1 wherein the trainer can direct the headset to display to the trainee the AOI.

5. The system of claim 1 wherein the trainer can request, through the computing device, a confirmation that the AOI is within the FOV of the headset.

6. The system of claim 1 wherein the trainee pointer and trainer pointer allow the trainee and trainer to highlight the AOI with a geometric shape.

7. The system of claim 1 wherein the trainee pointer and trainer pointer are adjustable to indicate an AOI as small as a single point or a geometric shape as large as desirable within the FOV.

8. The system of claim 1 wherein the headset is configured to calculate a direction and magnitude of a discrepancy between the FOV of the first headset and the AOI.

9. The system of claim 8 wherein the headset is configured to display an adjustment direction corresponding to the discrepancy.

10. The system of claim 8 wherein the headset is configured to display an adjustment magnitude corresponding to the discrepancy.

11. The system of claim 1 wherein an object that is part of the live procedure contains an identifying mark recognizable by the headset, wherein the identifying mark is recognizable by the headset as an AOI.

12. The system of claim 11 wherein the object is a glove worn by the trainer or trainee.

13. The system of claim 11 wherein the object is held by the trainer or the trainee.

14. The system of claim 11 wherein the mark includes an instruction to the headset to adjust the FOV.

15. A method for operating a headset to orient a Field of View (FOV) of the headset toward a desired object, the method comprising:
   providing a headset having a see-through-optic display and having a viewing pane configured to display augmented reality images that correspond with a live procedure the headset, wherein the headset is coordinated to exchange information including views with a computing device, the headset having a pointer that can selectively indicate an Area of Interest (AOI) of an object within the FOV;
   receiving an AOI from the headset via the pointer;
   displaying the AOI using augmented reality images on at least one of the headset or the computing device;
   comparing a FOV of the headset with the AOI to determine whether or not the AOI is within the FOV of the headset; and
   notifying whether or not the AOI is within the FOV of the headset.

16. The method of claim 15 wherein the pointer is a laser pointer, and wherein the AOI received from the headset via the pointer is displayed on the computing device.

17. The method of claim 15, further comprising determining that the AOI is not within the FOV, and issuing a notification that the AOI is not within the FOV.

18. The method of claim 17, further comprising determining a direction between the AOI and the FOV.

19. The method of claim 18, further comprising determining a magnitude of a distance between the AOI and the FOV.

20. The method of claim 15 wherein the live procedure includes a visible object having a code, the code pertaining to desired viewing parameters of the object, the method further comprising the headset reading the code and executing the viewing parameters.

* * * * *